(12) United States Patent
Frenal et al.

(10) Patent No.: US 11,002,410 B2
(45) Date of Patent: May 11, 2021

(54) CYLINDER OF PRESSURISED FLUID

(71) Applicant: L'Air Liquide, Société Anonyme pour l'Etude et l'Exploitation des Procédés Georges Claude, Paris (FR)

(72) Inventors: Antoine Frenal, Ezanville (FR); Renaud Ligonesche, Herblay (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 202 days.

(21) Appl. No.: 15/768,087

(22) PCT Filed: Sep. 22, 2016

(86) PCT No.: PCT/FR2016/052399
§ 371 (c)(1),
(2) Date: Aug. 24, 2018

(87) PCT Pub. No.: WO2017/064380
PCT Pub. Date: Apr. 20, 2017

(65) Prior Publication Data
US 2018/0363854 A1 Dec. 20, 2018

(30) Foreign Application Priority Data
Oct. 15, 2015 (FR) ...................................... 1559792

(51) Int. Cl.
*F17C 13/02* (2006.01)
*G01L 7/16* (2006.01)
(52) U.S. Cl.
CPC ............ *F17C 13/025* (2013.01); *G01L 7/163* (2013.01); *F17C 2201/032* (2013.01);
(Continued)

(58) Field of Classification Search
USPC .......................................................... 141/95
See application file for complete search history.

(56) References Cited

U.S. PATENT DOCUMENTS 1,731,632 A 10/1929 Main
3,222,933 A 12/1965 Howard
(Continued)

FOREIGN PATENT DOCUMENTS

EP 2 171 342 4/2010
FR 2 429 601 1/1980
(Continued)

OTHER PUBLICATIONS

International Search Report for corresponding PCT/FR 2016/052399, dated Feb. 9, 2017.
(Continued)

*Primary Examiner* — Daphne M Barry
(74) *Attorney, Agent, or Firm* — Elwood L. Haynes

(57) ABSTRACT

A cylinder of pressurized fluid, including a valve assembly housing a fluid circuit including at least one shut-off valve, the cylinder being equipped with a bonnet for protecting the valve assembly including a rigid structure delimiting a protective volume around the valve assembly, including a pressure indicating device including at least one piston sensitive to the pressure in the cylinder and mobile relative to the body of the valve assembly according to the level of pressure in the cylinder between at least a retracted first position and a deployed second position, the pressure indicating device including at least one mobile information support configured to collaborate mechanically with the piston, the information support being able to move between at least two distinct positions or states to symbolize respectively at least two levels of pressure according to the position of the piston.

15 Claims, 8 Drawing Sheets

(52) U.S. Cl.
 CPC .. *F17C 2201/056* (2013.01); *F17C 2201/058* (2013.01); *F17C 2205/0165* (2013.01); *F17C 2205/0308* (2013.01); *F17C 2205/0326* (2013.01); *F17C 2205/0329* (2013.01); *F17C 2205/0394* (2013.01); *F17C 2223/0123* (2013.01); *F17C 2223/036* (2013.01); *F17C 2250/043* (2013.01); *F17C 2250/0491* (2013.01); *F17C 2270/0745* (2013.01)

(56) References Cited

U.S. PATENT DOCUMENTS

| | | | |
|---|---|---|---|
| 6,137,417 | A | 10/2000 | McDermott |
| 6,698,414 | B1 * | 3/2004 | Menow ................ F41B 9/0018 124/69 |
| 2005/0229981 | A1 | 10/2005 | Frederiksen |
| 2009/0272443 | A1 | 11/2009 | Lee |
| 2012/0006445 | A1 | 1/2012 | Frenal et al. |
| 2015/0034184 | A1 * | 2/2015 | Schmitz ................ G01L 19/10 137/544 |

FOREIGN PATENT DOCUMENTS

| | | |
|---|---|---|
| FR | 2 962 519 | 7/2012 |
| WO | WO 2012 034927 | 3/2012 |
| WO | WO 2013 127895 | 9/2013 |

OTHER PUBLICATIONS

International Written Opinion for corresponding PCT/FR 2016/052399, dated Feb. 9, 2017 (English translation).

* cited by examiner

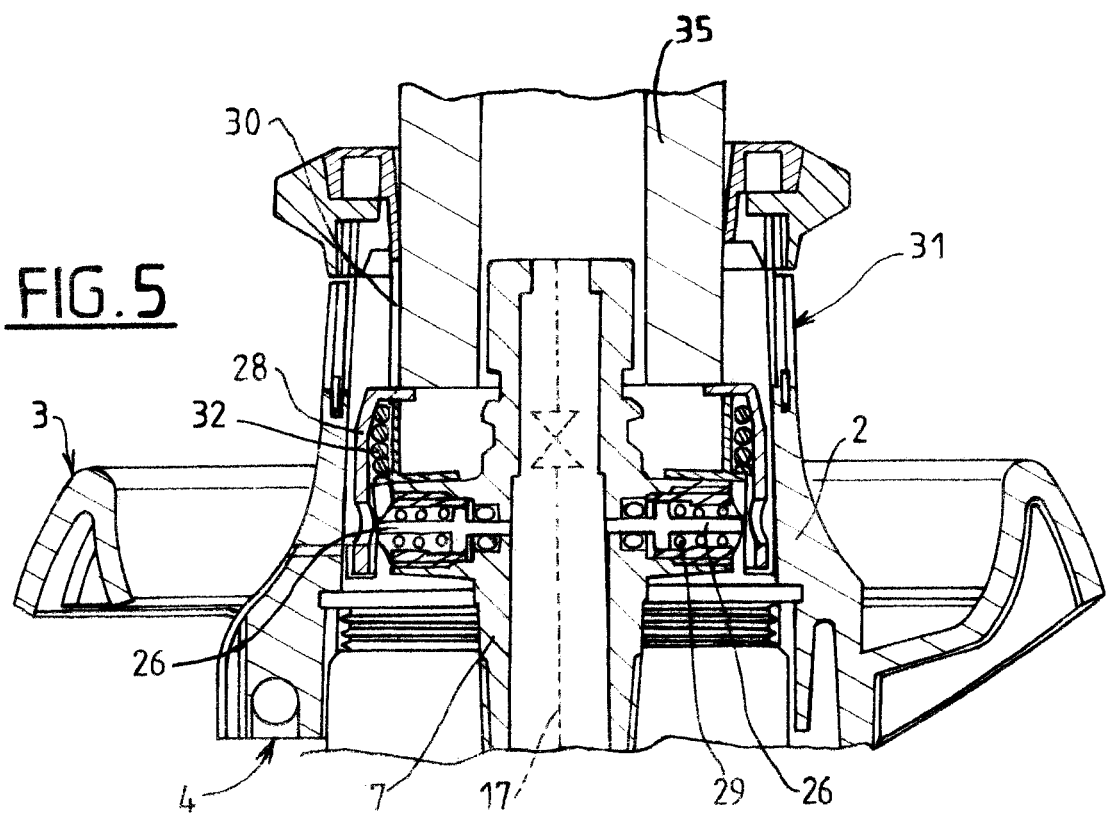
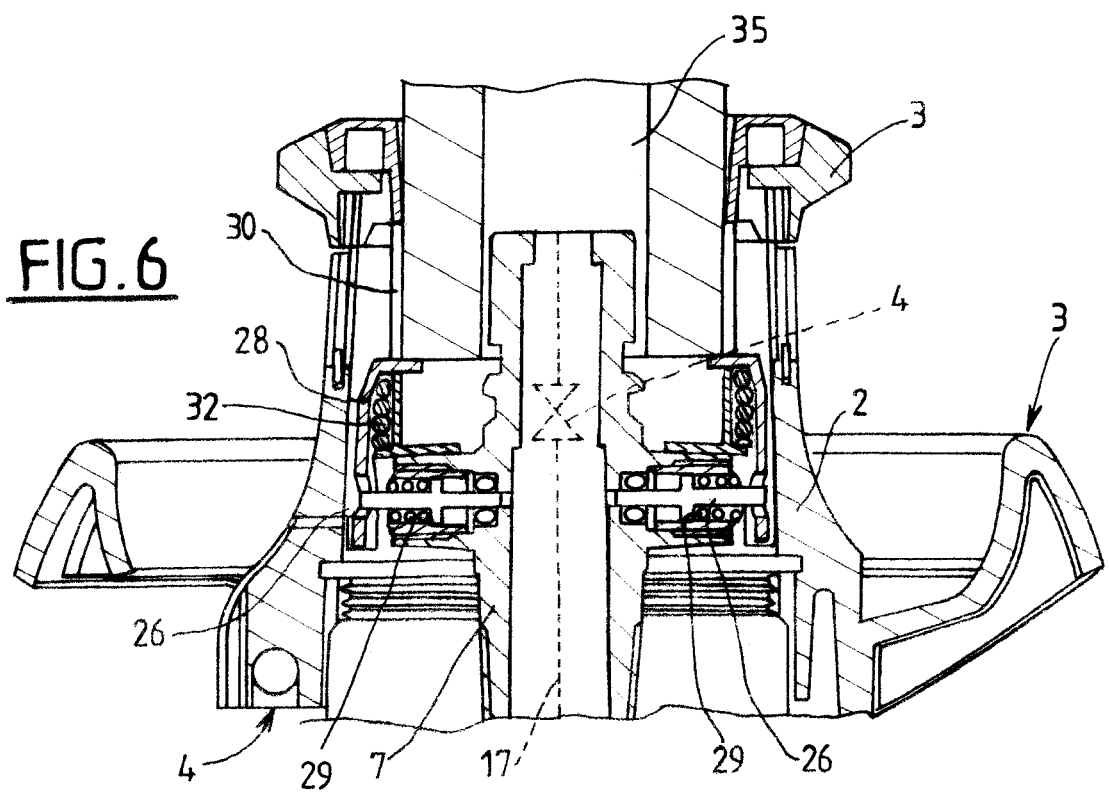

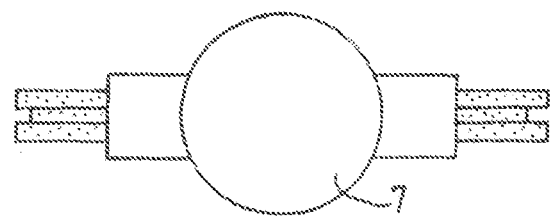
FIG.18
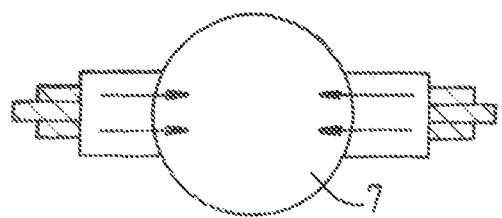
FIG.19
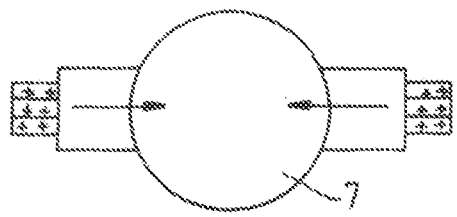
FIG.20
FIG.21
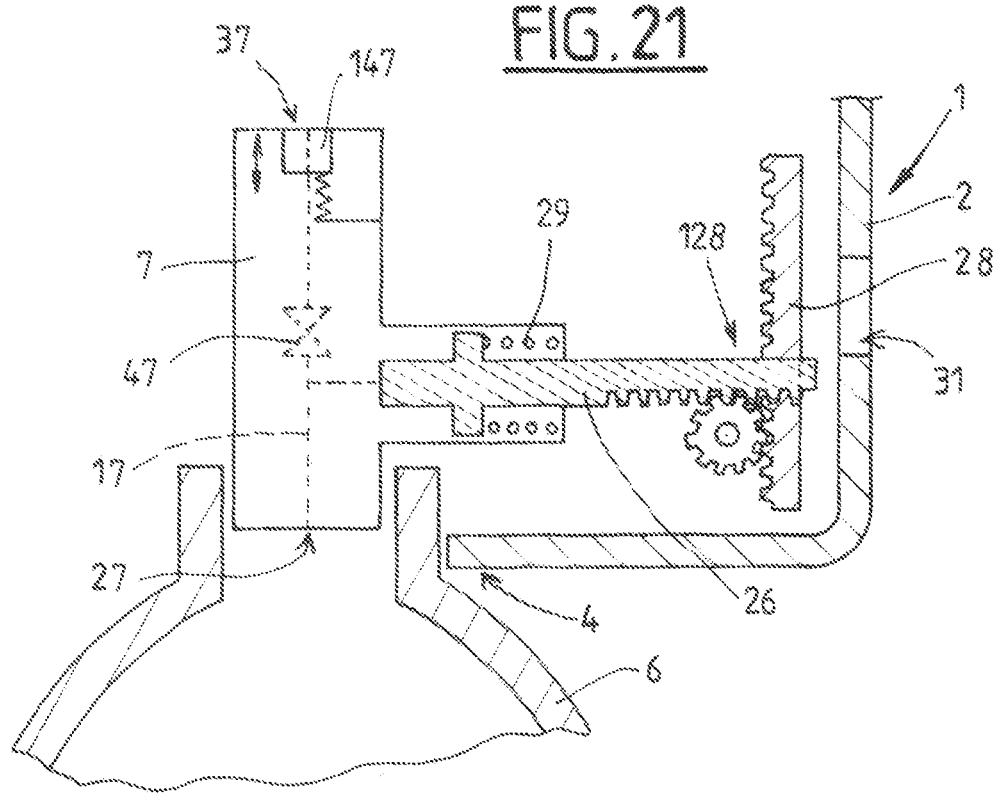

CYLINDER OF PRESSURISED FLUID

CROSS REFERENCE TO RELATED APPLICATIONS

This application is a 371 of International Application PCT/FR2016/052399 filed Sep. 22, 2016, which claims priority to French Patent Application No. 1559792 filed Oct. 14, 2015, the entire contents of which are incorporated herein by reference.

BACKGROUND

The present invention relates to a cylinder of pressurized fluid.

The invention relates more particularly to a cylinder of pressurized fluid, notably pressurized gas, comprising a valve assembly housing a fluid circuit comprising at least one shut-off valve, the cylinder being equipped with a bonnet for protecting the valve assembly comprising a rigid structure delimiting a protective volume around the valve assembly, the cylinder comprising a pressure indicating device comprising at least one piston sensitive to the pressure in the cylinder and mobile relative to the body of the valve assembly according to the level of pressure in the cylinder between at least a retracted first position and a deployed second position, the pressure indicating device comprising at least one mobile information support intended to collaborate mechanically with the piston, the information support being able to move between at least two distinct positions or states to symbolize respectively at least two levels of pressure according to the position of the piston.

In order to indicate to the user of a cylinder of pressurized fluid how much autonomy remains, it is known practice to provide a pressure gauge on the valve assembly of the cylinder. This pressure gauge is generally mounted on a valve assembly and protected, with the valve assembly, by a protective bonnet. In order to be visible to the user, the pressure gauge is generally accessible via an opening in the protective bonnet.

Another known solution is to provide a piston which projects from the body of a valve assembly to a greater or lesser degree according to the pressure to which it is subjected.

However, in certain situations it is desirable to be able to have a member for displaying information indicative of the quantity of fluid remaining in the cylinder which is more reliable and/or more visible to the user, even from a distance of several meters away from the cylinder.

SUMMARY

It is an object of the present invention to overcome all or some of the abovementioned disadvantages of the prior art or to propose a device that is improved with respect to the prior art.

To this end, the cylinder according to the invention, in other respects in accordance with the generic definition given thereof in the above preamble, is essentially characterized in that the bonnet comprises at least one opening forming a viewing window for viewing the position or the state of the information support.

Moreover, some embodiments of the invention may comprise one or more of the following features:
the information support is mobile along a path which coincides at least in part with the at least one opening,
the cylinder comprises an information support that is mobile relative to the bonnet between at least a first position and a second position which are distinct, the information support being urged toward its second position via a return member, in its deployed position, the piston forming an end stop immobilizing the information support in its first position and preventing it from moving toward its second position,
in its retracted position, the piston does not impede the movement of the information support toward its second position, which means to say that, when the piston is in the retracted position, the information support is automatically moved into its second position by the action of the return member,
the at least one information support is arranged between the valve assembly and the bonnet,
the piston is mobile relative to the body of the valve assembly into at least three stable positions: the retracted position, the deployed position and at least one intermediate position between the deployed and retracted positions, said three positions respectively corresponding to three distinct levels of pressure in the cylinder,
the information support can be moved between at least three stable distinct positions or states respectively symbolizing three distinct levels of pressure,
the cylinder comprises several pistons sensitive to the pressure in the cylinder, notably two, three or four pistons, collaborating with one, two or more than two respective or shared information supports,
the cylinder comprises pistons of which the respective retracted/deployed positions relative to the body of the valve assembly are configured for different determined respective levels of pressure in the cylinder in order to command distinct positions and/or states of one or more information supports and respectively display at least three distinct levels of pressure at the at least one opening,
the at least one information support comprises a sleeve of cylindrical overall shape mounted mobile between the bonnet and the valve assembly in a vertical direction parallel to the vertical axis of the cylinder, in at least one of its positions, the information support being situated behind the opening,
the at least one information support comprises an external face equipped with visual information comprising at least one of the following: a zone in one or more color(s) or shade(s), one or more alphanumerical symbol(s), the visual information being intended to be exposed in the opening or not exposed depending on the position of the at least one support,
the cylinder comprises a reference wall fixed to the valve assembly and arranged between the valve assembly and the bonnet,
the valve assembly is screwed into a tapped orifice in the cylinder, the reference wall comprises a portion forming an end stop for the vertical positioning of the bonnet with respect to the valve assembly,
the reference wall comprises a portion situated facing the at least one opening forming a viewing window,
the piston is translationally mobile,
the information support is translationally and/or rotationally mobile,
the piston and the information support are mobile in directions that are not parallel and that are preferably perpendicular, the piston comprising a first end in communication with the fluidic circuit of the valve assembly and a second end oriented toward the outside of the valve assembly, the piston is urged by at least one return member toward its retracted position, the internal fluidic circuit of the valve assembly extends between an upstream end in communication with the storage volume of the cylinder and a downstream end opening on to an outlet connector of the valve assembly, notably a withdrawing and possibly filling connector, the at least one information support is incorporated into a wall of the bonnet, the information support is mechanically connected to the piston(s) via a movement transmission mechanism, notably a rack(s) and/or pinion(s) system to move the information support automatically when the piston is moved, the bonnet comprises a first wall forming a tubular portion around the valve assembly and extending between, on the one hand, the lower end connected to the cylinder and an upper end, the opening or openings being formed in the cylindrical portion of the first wall, the information support is mobile between the reference wall and the bonnet.

The invention may also relate to any alternative device or method comprising any combination of the features listed hereinabove or hereinbelow.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 5 is a view similar to that of FIG. 1 in which a cylinder conditioning tool is introduced into the bonnet, FIG. 6 is a view similar to that of FIG. 5, in which the cylinder of pressurized fluid is in its first state of fill, FIG. 21 is a schematic and partial cross section of a detail of the upper end of a cylinder illustrating yet another exemplary embodiment of a pressure indicating device according to the invention.

DESCRIPTION OF PREFERRED EMBODIMENTS

Figure 1:
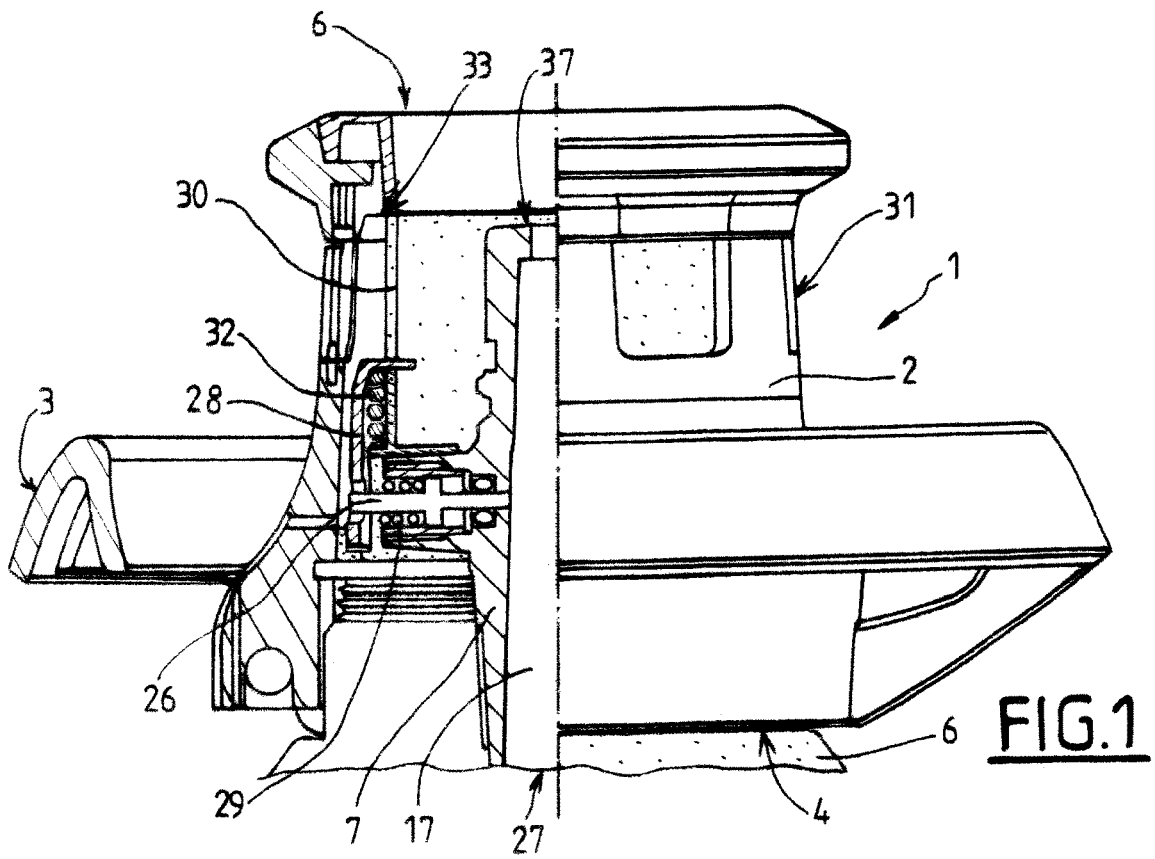
FIG. 1 depicts a side view, in part section, of the upper end of a cylinder of pressurized fluid according to a first exemplary embodiment of the invention and in a first state of fill of the cylinder.

The cylinder 6 of pressurized fluid, notably pressurized gas, which is illustrated in the figures conventionally comprises a valve assembly 7 housing a fluid circuit 17 comprising at least one shut-off valve 47. The valve 47 is, for example, a shut-off valve operated manually or automatically via a handwheel or lever or via a valve pusher of a member that connects to the valve assembly 7.

The fluidic circuit 17 internal to the valve assembly 7 preferably extends between an upstream end 27 in communication with the storage volume of the cylinder 6 (at the storage pressure of the cylinder 6) and a downstream end 37 opening on to an outlet connector, notably a withdrawing and possibly filling connector.

As depicted schematically in FIG. 21, the circuit 17 may notably comprise a shut-off valve (shutter) 47 and possibly a dust valve 147 arranged at the downstream end 37. In this regard, reference may be made nonlimitingly for example to the structure of the valve assembly described in document FR2962519A1 which can be used at least in part in the present invention.

The cylinder 6 is equipped with a bonnet 1 for protecting the valve assembly 7. The bonnet 1 conventionally comprises a rigid structure delimiting a protective volume around the valve assembly (rigid wall(s) which may or may not be perforated).

The cylinder 6 comprises a pressure indicating device comprising at least one piston 26 sensitive to the pressure in the cylinder 6 and mobile relative to the body of the valve assembly 7 according to the level of pressure in the cylinder 6.

The piston 26 is preferably mounted in the body of the valve assembly 7, for example transversely with respect to the vertical axis of the valve assembly 7 and of the cylinder 6. The piston 26 is mobile with respect to the valve assembly 7 between at least a retracted first position (cf. FIGS. 3, 4, 5, 7) and a deployed second position (cf. FIGS. 1, 2 and 6).

The piston 26 is, for example, translationally mobile. In a conventional way, the piston 26 may comprise a first end in communication with the fluidic circuit 17 of the valve assembly 7 (upstream of the shut-off valve 47) and a second end oriented toward the outside of the valve assembly 7. The piston 26 may be urged by at least one return member 29 (such as a spring) toward its retracted position.

Thus, the higher the pressure in the cylinder 6 the greater the extent to which the piston projects as far as a limit position (deployed position) and conversely when the pressure drops, the piston 26 retracts into its housing.

In addition, the pressure indicating device comprises at least one mobile information support 28 intended to collaborate mechanically with the piston 26 in at least one position. The information support 28 is mobile, for example translationally mobile, between at least two distinct positions or states to respectively symbolize at least two levels of pressure according to the position of the piston 26 with respect to the valve assembly 7.

Furthermore, the bonnet 1 comprises at least one and preferably several openings 31 on the periphery thereof forming viewing windows for viewing the position or state of the information support 28.

The information support 28 is, for example, translationally mobile in a direction parallel to the vertical (longitudinal) axis of the cylinder 6.

For example, the information support 28 is mobile along a path which coincides at least in part with the opening 31 (which means to say that the information support comprises at least one determined zone which positions itself behind the opening, or not, the term behind referring to the position of a user situated in front of the valve assembly and of the opening). What that means to say is that the support 28 may or may not be positioned facing the opening 31.

The information support 28 is, for example, visible through the opening 31 in a viewing direction, notably a viewing direction which is perpendicular to the vertical axis of the cylinder (when the cylinder is in the vertical position of use). What that means to say is that the opening 31 is situated on a lateral face of the bonnet and a user can look through the opening 31 in a direction of viewing perpendicular or substantially perpendicular to the vertical direction of the cylinder and of the bonnet. The information support 28 may itself be mobile along a path which is not parallel to said viewing direction. Notably the path along which the information support 28 moves may be parallel or substantially parallel to the vertical axis of the cylinder. What that means to say is that the information support 28 may move transversely (perpendicularly) to the viewing direction of the user and have at least a part to be visible or not through the orifice 31 (according to its position with respect to the orifice 31).

This makes it possible to plan for directions and amplitudes of movement of the mobile information support 28 which are independent of the directions and amplitudes of movement of the piston or pistons. What that means to say is that the information support 28 can move in a different direction and along a path which is not necessarily governed by the direction and amplitude of the movement of the piston 26.

Thus, the information support 28 may be mobile in a direction that is transverse (for example perpendicular) to the direction of movement of the piston or pistons.

What that means to say is that the openings 31 (hole(s) which may or may not be closed by a transparent or translucent window) allow the relative position of the information support 28 with respect to the window or windows 31 to be seen through the bonnet 1.

The openings 31 may be arranged on a first lateral wall 2 surrounding the valve assembly 7. Thus, by looking at the bonnet 1 laterally, a user can discern from afar whether the information support 28 is situated (partially or fully or not at all) behind the orifice 31.

The bonnet 1 may comprise one or several viewing openings distributed on the circumference of the bonnet 1. For example, several circular or rectangular or square openings 31 or one or more elongate slots.

To this end, the information support 28 may comprise an external face equipped with visual information comprising at least one of the following: a zone in one or several color(s) or shade(s) (red/yellow/green) and/or one or more alphanumeric symbols. In this way, visual information may or may not be exposed in the opening 31 according to the position of the at least one support 28 with respect to the bonnet 1.

Figure 2:
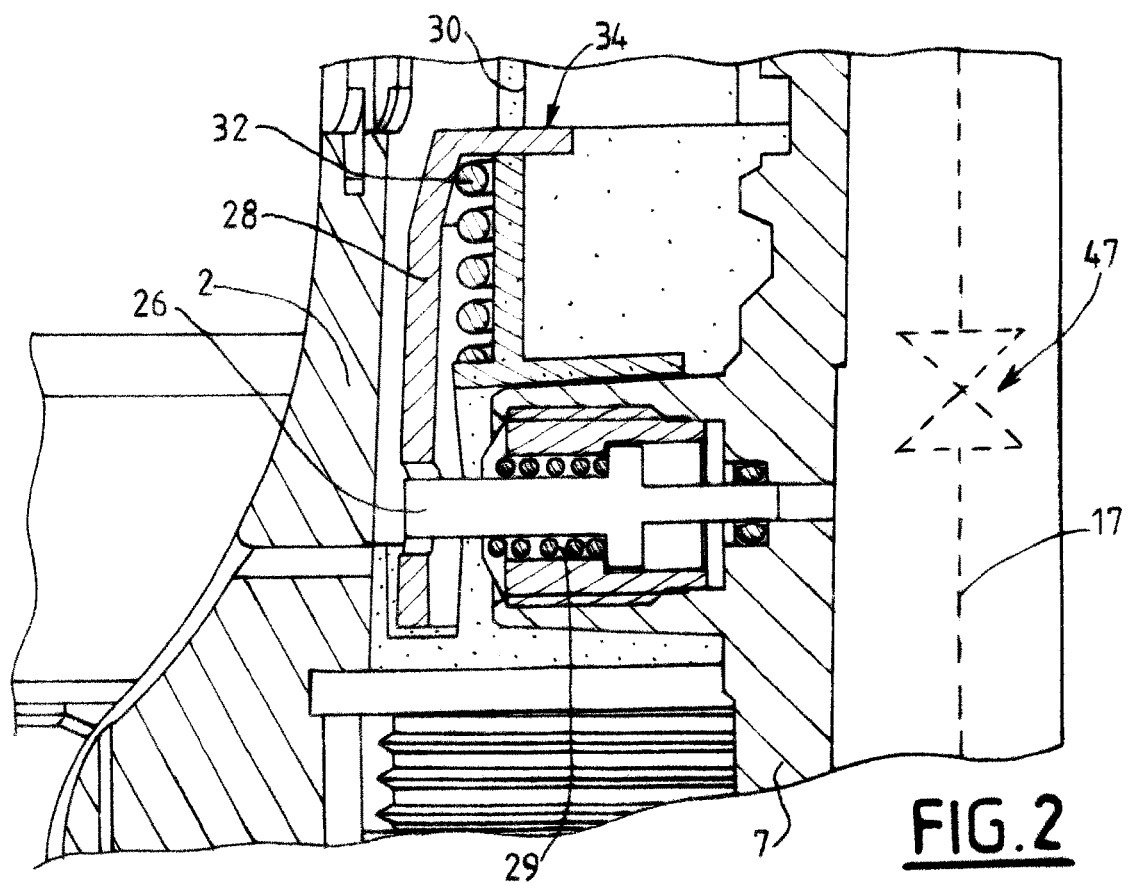
FIG. 2 depicts an enlarged view of a detail of FIG. 1.
Figure 3:
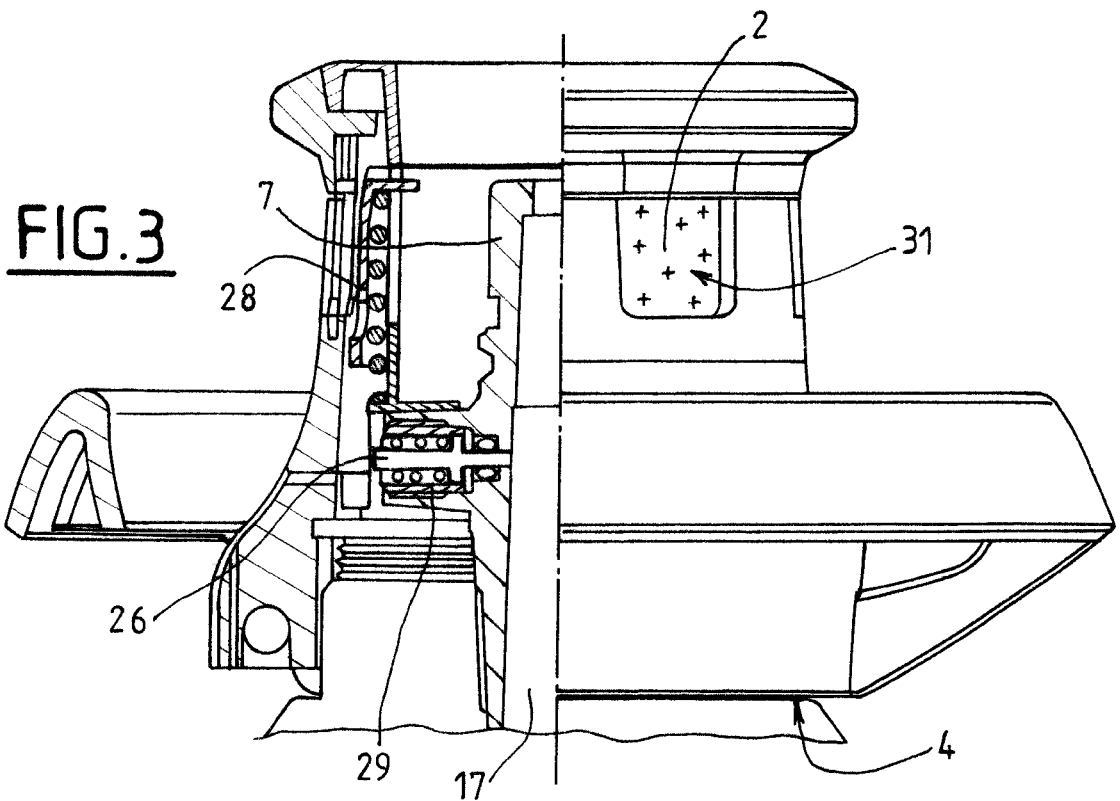
FIG. 3 depicts a view similar to that of FIG. 1, in which the cylinder of pressurized fluid is in a second state of fill.

In the embodiment of FIGS. 1 to 7, the information support 28 is mobile relative to the bonnet 1 between at least a first position (for example low position, cf. FIGS. 1 and 2) and a distinct second position (for example high position, cf. FIG. 3). The information support 28 is also urged toward its second position via a return member 32 (notably a spring). For preference, the return member 32 acts directly (or via an intermediate component) on the information support 28 in order to move it toward its second position. For preference, this return member 32 acts only on the mobile information support 28 and not on the piston or pistons 26. This makes it possible to plan for movements of the information support 28 (amplitude and direction) which are not dependent on the amplitude and direction of the movement of the piston. Put plainly, a small movement of the piston 26 may free the information support 28 which moves in a determined direction and along a determined path under the action of the return member 32.

In addition, in its deployed position, the piston 26 forms an end stop immobilizing the information support 28 in its first position and preventing it from moving toward its second position. In the nonlimiting example depicted in FIG. 1, when the information support 28 is in its first position and the piston 26 is in its deployed position, the piston 26 is housed in a mating housing or orifice formed in the information support 28. What that means to say is that the piston 26 forms a locking finger immobilizing the information support 28.

By contrast, as the piston 26 retracts (below a determined threshold of pressure in the cylinder 6), the piston 26 arrives in a position in which it no longer impedes the movement of the information support 28. For example, one end of the piston 26 protrudes from the orifice of the information support 28 (cf. FIG. 3).

The information support 28 can be moved automatically into its second position by the action of the return member 32.

These two distinct positions determine two distinct pieces of information visible through the orifice or orifices 31. For example, a first color such as green is placed behind the orifice 31 when the pressure in the cylinder 6 is higher than a determined threshold (corresponding for example to 10% or 15% or 20% or 25% or 30% or more of its maximum pressure). By contrast, a second color such as red is placed behind the orifice 31 when the pressure in the cylinder 6 is below this determined threshold. The threshold for switching over from one configuration to the other may be chosen according to the application or the need in the specification for example of the loading of the return member 29 acting on the piston 26.

As illustrated, the information support 28 is preferably positioned between the valve assembly 7 and a wall 2 of the bonnet 1.

Figure 4:
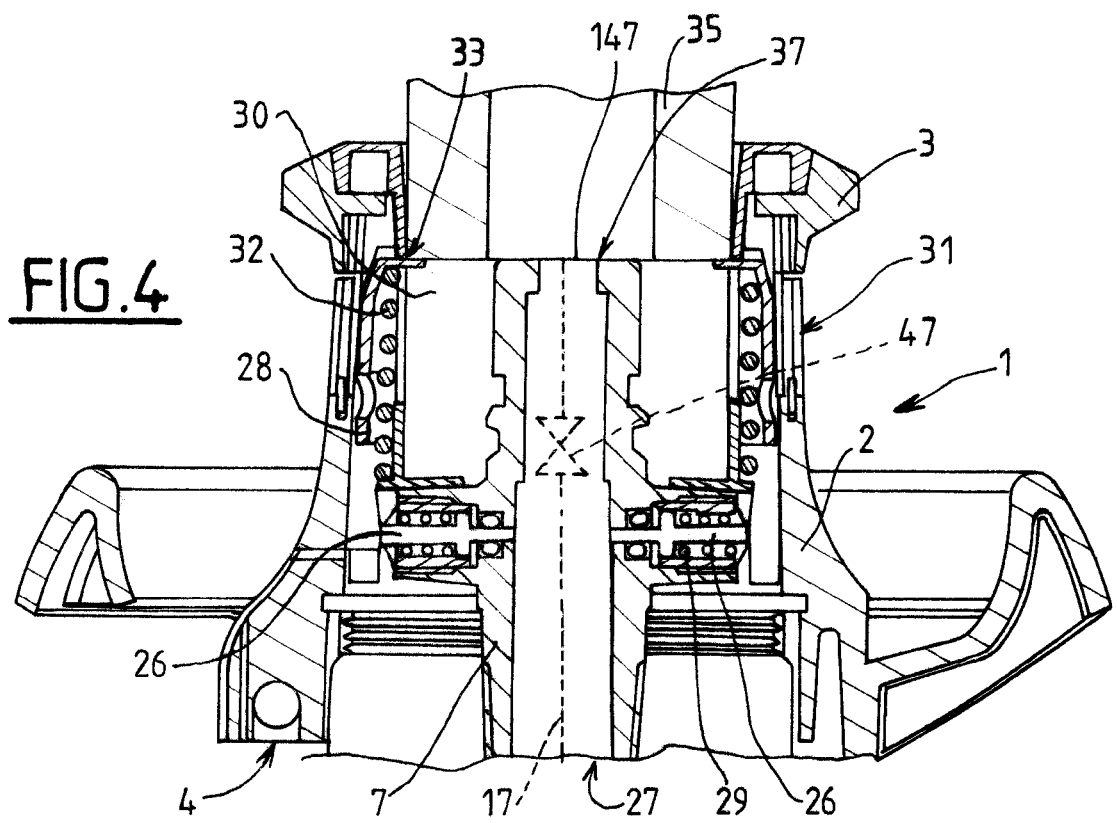
FIG. 4 is a view similar to that of FIG. 1 in which a cylinder conditioning tool is introduced into the bonnet.
Figure 7:
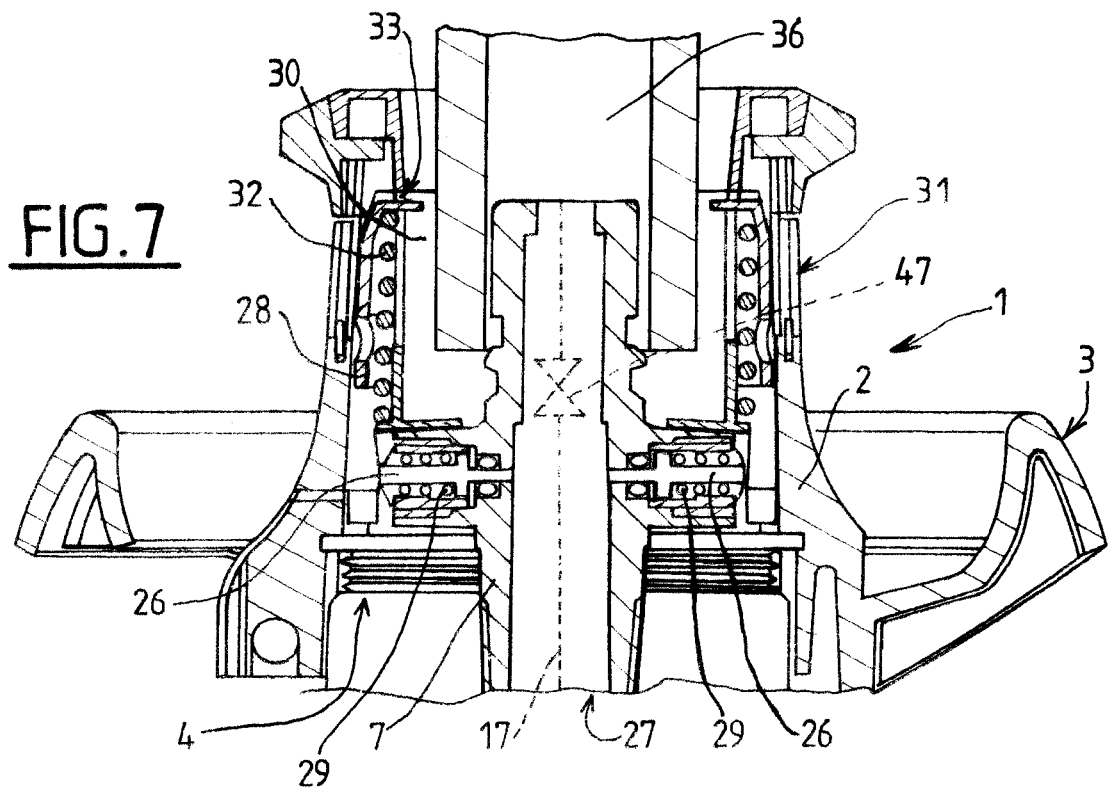
FIG. 7 is a view similar to that of FIG. 3, in which a user member is connected to the valve assembly of the cylinder.

As visible in FIGS. 4, 5 and 7, the pressure indicating device may comprise two (or more) pistons 26 distributed around the body of the valve assembly 7.

The information support 28 may comprise for example a sleeve of cylindrical overall shape mounted mobile between the bonnet 1 and the valve assembly 7. The cylinder sleeve may for example slide vertically in a direction parallel to its generatrices and to the longitudinal axis of the cylinder. Two lateral ends of the sleeve 28 are designed (being orifices or the like) to collaborate with respective pistons 26.

Two or more than two pistons 26 may collaborate with the one same information support 28 or with distinct respective information supports 28 which may or may not be independent.

Figure 13:
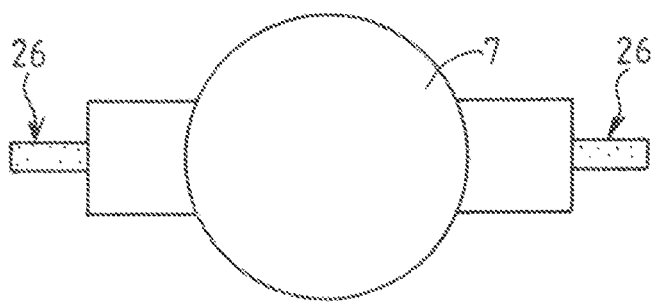
Figure 14:
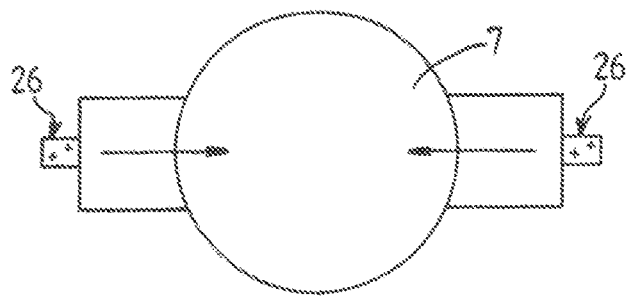

FIG. 13 schematically shows a view from above of the valve assembly 7 with two pistons 26 deployed, whereas FIG. 14 depicts this same arrangement with the two pistons 26 retracted. For the sake of simplicity, the information support has not been depicted, but the coloration of the pistons 26 has been changed between FIGS. 13 and 14 according to their position in order to symbolize the difference in shade or information generated at the viewing orifices 31 (via the information support or supports 28).

In the above examples, the pressure indicator may indicate two states (corresponding respectively to two levels of pressure). Of course, the invention is not restricted to that example. Thus, it is possible to envision displaying three or more than three different levels of pressure (four, five, etc.). Three levels of pressure may be defined with respect to two thresholds for the pressure in the cylinder ((i) a pressure above a first pressure threshold, (ii) a pressure between the first pressure threshold and a second pressure threshold, and (iii) a pressure below the second pressure threshold).

This can be achieved via one, two or more than two pistons 26 collaborating with one or more display supports 28.

Figure 8:
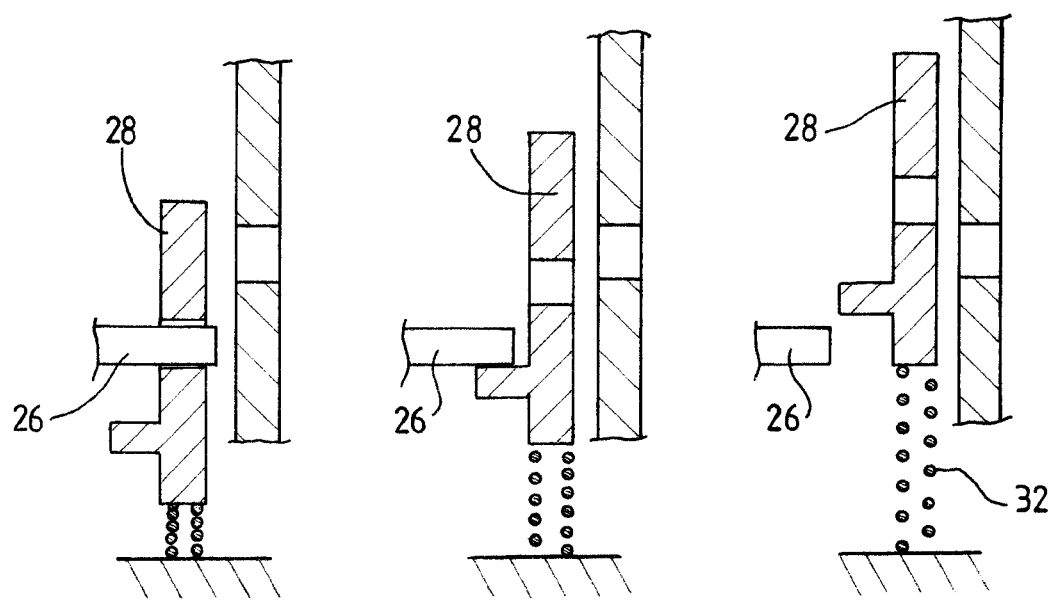
FIG. 8 is a schematic and partial cross section illustrating another exemplary embodiment of a pressure indicating device according to three distinct states respectively, FIG. 9 schematically and partially respectively illustrates a first possible embodiment, according to three distinct states, of the structure of an information display member of a pressure indicating device according to the invention, FIG. 10 schematically and partially representatively illustrates a second possible embodiment, according to three distinct states, of the structure of an information display member of a pressure indicating device according to the invention, FIG. 11 schematically and partially representatively illustrates a third possible embodiment, according to three distinct states, of the structure of an information display member of a pressure indicating device according to the invention, FIG. 12 schematically and partially representatively illustrates a fourth possible embodiment, according to three distinct states, of the structure of an information display member of a pressure indicating device according to the invention, FIG. 13 schematically and partially depicts a view from above of a valve assembly illustrating one example of part of the pressure indicating mechanism according to the invention, FIG. 14 schematically and partially depicts a view from above a valve assembly illustrating one example of part of the pressure indicating mechanism according to the invention, FIG. 15 schematically and partially depicts a view from above of a valve assembly illustrating another example of part of the pressure indicating mechanism according to the invention, FIG. 16 schematically and partially depicts a view from above of a valve assembly illustrating another example of part of the pressure indicating mechanism according to the invention, FIG. 17 schematically and partially depicts a view from above of a valve assembly illustrating another example of part of the pressure indicating mechanism according to the invention, FIG. 18 schematically and partially depicts a view from above of a valve assembly illustrating another example of part of the pressure indicating mechanism according to the invention, FIG. 19 schematically and partially depicts a view from above of a valve assembly illustrating another example of part of the pressure indicating mechanism according to the invention, FIG. 20 schematically and partially depicts a view from above of a valve assembly illustrating another example of part of the pressure indicating mechanism according to the invention.

In the example of FIG. 8, the piston 26 may position itself in three distinct stable positions depending on the pressure in the cylinder 6. Above a first pressure threshold, in a first position, for example deployed (to the left in FIG. 8), the piston 26 blocks the information support 28 in a first position (for example a low position). Below this first pressure threshold, the piston 26 retracts in part and frees the information support 28 which is moved by a return member 32 into a second stable position blocked by the piston 26 (for example via an end stop), cf. central part of FIG. 8 (intermediate position). Finally, below a second pressure threshold lower than the first threshold, the piston 26 completely retracts and completely frees the information support 28 which adopts a third position with respect to the viewing orifice 31 (for example a high position).

These three levels of pressure thus generate three distinct displays at the viewing orifice or orifices 31.

Figure 9:
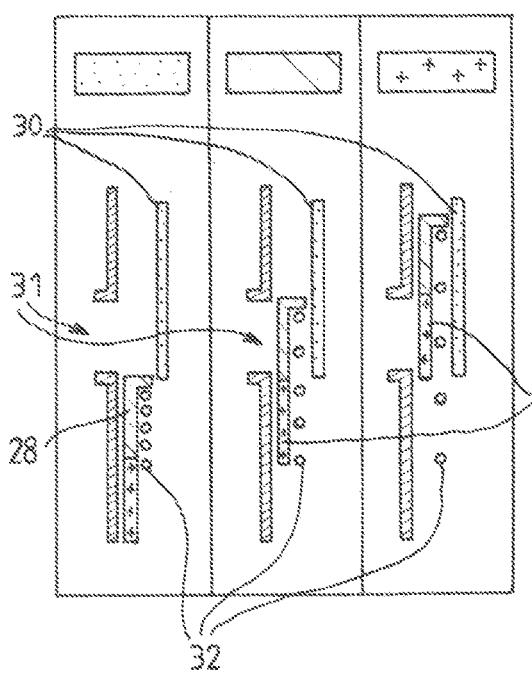

This structure is also depicted schematically in vertical section in FIG. 9 where the information support 28 can adopt three distinct stable positions with respect to a viewing window 31. These three positions reveal at the window 31 distinct respective colors and/or symbols (cf. the face-on views of the window which are illustrated in rectangles in the upper part of FIG. 9). From left to right, the three positions correspond for example to three decreasing levels of pressure.

Figure 10:
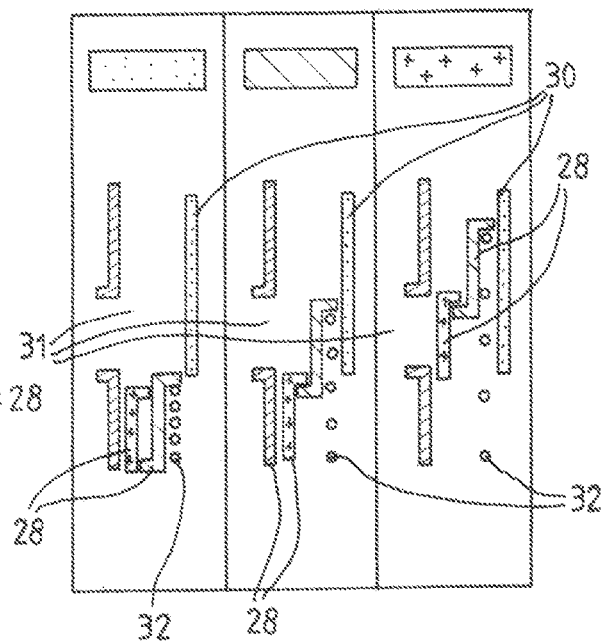

The alternative form in FIG. 10 differs from that of FIG. 9 in that the information support 28 comprises two distinct components which can fit together (first position) or deploy relative to one another (second and third positions). For example, the return member 32 acts on one of the components which drives the second component into the third position.

Figure 11:
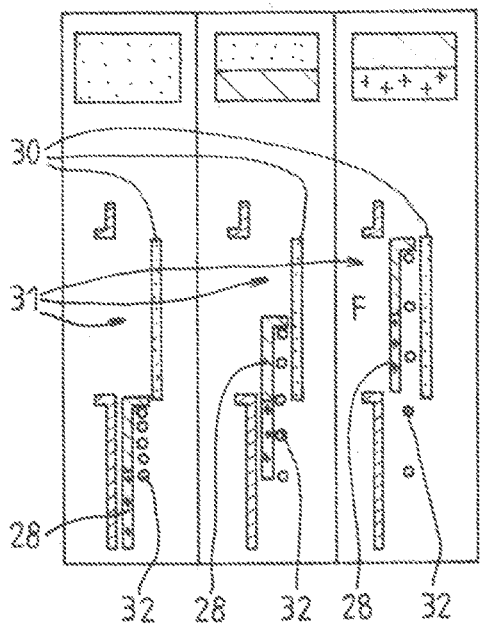

In the alternative form of FIG. 11, the information support 28 comprises two adjacent portions equipped with distinct respective information (colors or the like). This makes it possible to produce three distinct displays (one color in the first position (given by a fixed end of the valve assembly or of a wall 30 housed in the bonnet 1), a first combination of two colors in the second position and a second combination of colors in the third position).

Figure 12:
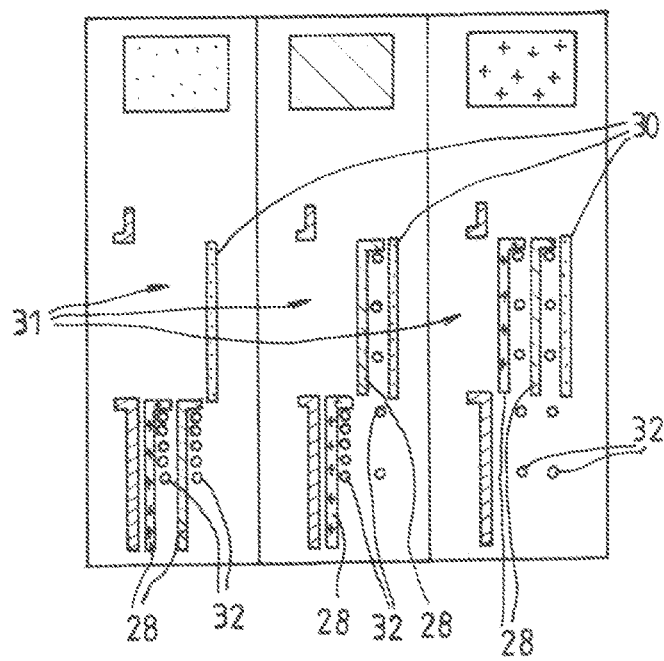

In the alternative form of FIG. 12, the information support 28 comprises two distinct components each associated with a respective return member 32 (spring). In the first position on the left the two information supports 28 are outside the viewing window 31. In the central second position, a single information support 28 is positioned facing the viewing orifice 31. In the third position on the right the second information support 28 also faces the viewing orifice and masks the first information support.

Figure 22:
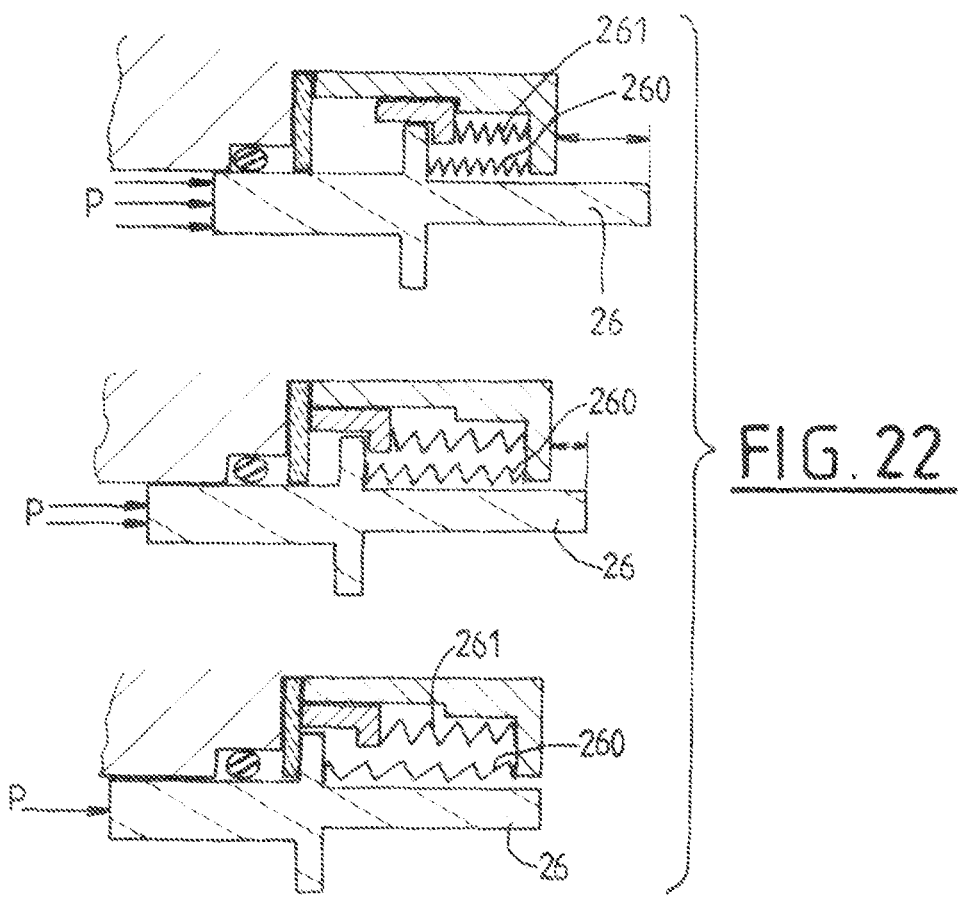
FIG. 22 is a schematic and partial cross section illustrating another exemplary embodiment of a pressure indicating device mechanism according to three distinct states respectively.

FIG. 22 schematically and partially illustrates one possible example of a mechanism for controlling the position of the piston 26 (respectively three positions) which can be applied to the arrangement of FIG. 8. One end of the piston 26 is subjected to the pressure P in the cylinder. When the pressure P is above a first threshold, the piston 6 is in a first position despite the effort of a first 260 and of a second 261 acting in parallel on the piston 26 (configuration at the upper end of FIG. 22). When this pressure drops below this first threshold, the springs 260, 261 force the piston 26 into an intermediate second position (central configuration in FIG. 22). Ultimately, when the pressure drops again below a second threshold, the piston is no longer in contact with the second spring 216 and moves into a third position (at the bottom of FIG. 22). Thus, the three positions of the piston 26 in the arrangement of FIG. 8 (projecting, intermediate and retracted) can be obtained via a mechanism with one or two pistons in parallel described hereinabove.

Figure 15:
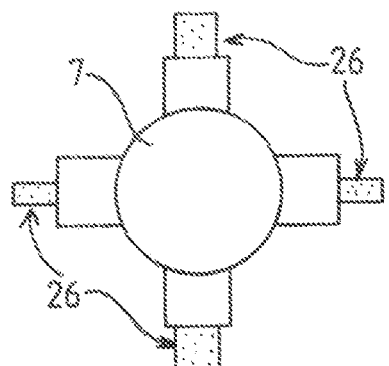

FIG. 15 illustrates a schematic and partial view from above of a valve assembly 7 illustrating another alternative form of embodiment with four pistons 26. In the configuration or state of FIG. 15, the four pistons 26 are in the deployed position and command a first piece of information via the viewing support or supports 28. For the sake of simplicity, the viewing support or supports 28 have not been depicted in FIGS. 15 to 17 but the corresponding information displayed has been symbolized by shading the piston or pistons 26. In the state of fill of FIG. 15, corresponds for example to a cylinder in a full state, using a green color.

Figure 16:
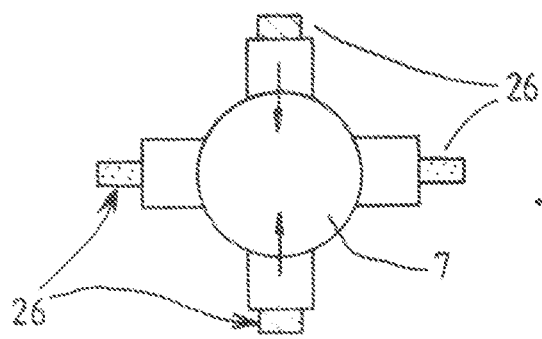

In the state of FIG. 16, when the pressure in the cylinder reaches a determined level, only two diametrically opposed pistons 26 are retracted (symbolized) by arrows. These two retracted pistons 26 alter the position or state of one or more information supports in order to alter the piece of information visible through the viewing orifices 31 (yellow color rather than green for example).

Figure 17:
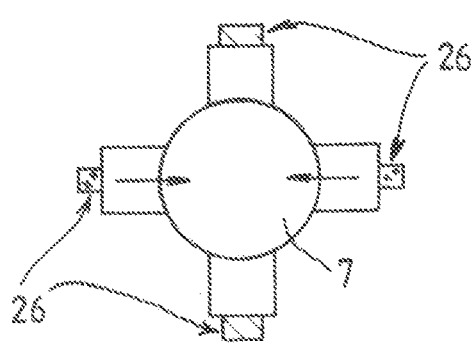

In the state of FIG. 17, when the pressure drops further down to another determined level, the other two diametrically opposed pistons 26 also retract. These two retracted pistons 26 alter the position or state of one or more information supports in order to alter the piece of information visible via the viewing orifices 31 (red color rather than yellow for example).

In the alternative form of FIGS. 18 to 20, the valve assembly 7 comprises two pairs of concentric pistons 26 arranged diametrically opposite one another (with respect to the vertical axis of the valve assembly and of the cylinder).

In the state of FIG. 18, the two pairs of pistons are deployed and condition the displaying of a first piece of information (for example a green color corresponding to a state of pressure higher than a first cylinder pressure threshold).

In the state of FIG. 19, a first pair of pistons 26 have retracted (cf. arrows) and condition the displaying of a second piece of information (for example a yellow color corresponding to a state of pressure below a first pressure threshold but above a second threshold in the cylinder).

In the state of FIG. 20, the second pair of pistons 26 is also retracted (cf. arrows) and conditions the displaying of a third piece of information (for example a red color corresponding to a state of pressure below the second pressure threshold).

FIG. 21 schematically symbolizes yet another alternative form in which an information support 28 is mechanically connected to the piston(s) 26 via a movement transmission mechanism 128. What that means to say is that the information support 28 is moved continuously with the piston 26. For example, a rack(s) and/or pinion(s) system may be provided to move the information support 28 automatically with respect to the viewing opening 31 when the piston 26 is moved.

As can be seen in FIG. 2, the upper end of the information support 28 may comprise a zone 34 (for example a horizontal portion) intended to collaborate with a tool used for filling the cylinder 6.

Thus, and as illustrated schematically in FIG. 4, when the cylinder 6 is empty or nearly empty, a conditioning (filling) tool 35 may be connected to the valve assembly 7 via an opening (for example vertical opening in the bonnet 1).

This tool 35 may connect to a coupling of the valve assembly 7 and at the same time move (push) the information support 28 against the effort of the return member 32 (cf. FIG. 5).

The tool comprises a tubular end which fits over the valve assembly 7 and at the same time pushes back the information support 28.

What that means to say is that the filling tool 35 performs the "resetting" of the information support 28. When the cylinder 6 is full, the piston 26 once again collaborates with the support 28 (cf. FIG. 6), and the system is once again in the configuration of FIG. 1.

The relative dimensions of the valve assembly 7 and of the information support or supports 28 are designed to leave a space between the valve assembly 7 and the information support 28 (for example of 10 mm) allowing another component 36 (flexible coupling, valve assembly with or without regulator, etc.) to be connected to the valve assembly 7 without interfering with the information support 28 (cf. FIG. 7). This concentric arrangement of the valve assembly 7, of the information support or supports 28, and of the bonnet 1 therefore offers numerous advantages.

In the above nonlimiting examples, the bonnet 1 comprises a first wall 2 forming a tubular portion around the valve assembly 7 and extending between, on the one hand, the lower end 4 connected to the cylinder 6 and an upper end 12 delimiting an access orifice 5. At least part of the viewing openings 31 are preferably formed in this cylindrical portion of the first wall 2.

In addition, and without this being in any way limiting, as illustrated in FIGS. 1 to 7, the bonnet 1 may further comprise a second wall 3 arranged concentrically and at a distance around the first wall 1 and delimiting a protective zone around the first wall 2. This second wall may notably form a zone for manual grasping and additional protection of the viewing orifices. The second wall 3 for example comprises an annular portion 13 arranged concentrically around the first wall 2.

For preference, the viewing orifices 31 are situated above the upper end of the second wall 3 (with respect to the vertical direction of the cylinder 6).

As illustrated in FIGS. 1 to 7, the device may comprise a reference internal wall 30 situated in the bonnet 1 between the valve assembly 7 and the bonnet 1 and notably between the valve assembly 7 and the information support 28. This reference wall 30 may be fixed to the valve assembly 7. This reference wall 30 preferably has a zone facing the viewing orifice or orifices 31. What that means to say is that this reference wall 30 can indicate a piece of information (color or the like) through the viewing orifice 31 when the information support 28 is not masking it (cf. figures).

The valve assembly 7 may be screwed into a tapped orifice in the cylinder 6. The precise positioning of the valve assembly 7 with respect to the bonnet 1 may be important for industrial reasons, particularly in order to be able to connect to the valve assembly of conditioning valves/tools.

Thus, the relative positioning of an upper downstream end 37 of the valve assembly 7 forming a fluidic coupling with respect to the end of the bonnet 1 needs to be able to be mastered. This may prove relatively awkward if the valve assembly 7 is screwed into the cylinder 6 because of the manufacturing and assembly tolerances.

For this reason, the reference wall 30 may also form a geometric reference for the positioning of the valve assembly 7 with respect to the bonnet 1. For this purpose, the reference wall 30 may comprise a portion (for example an end, notably upper end, cf. FIG. 1, forming an end stop 33 for the vertical positioning of the bonnet 1 with respect to the valve assembly 7. What this means to say is that the screwing of the valve assembly 7 into the cylinder may be performed to a height defined precisely by this end stop 33 between the reference wall and the bonnet 1. Conversely, the precise vertical positioning of the bonnet 1 on the cylinder 6 can be defined by this end stop 33 against the reference wall 30.

This structure or arrangement can be used independently of the pressure indicating device described hereinabove. What that means to say is that one embodiment may comprise a cylinder of pressurized fluid equipped with a valve assembly (notably screwed into the cylinder 6), with a bonnet 1 for protecting the valve assembly and a reference wall 30 fixed to the valve assembly 7 and comprising an end stop 33 for vertical (and/or lateral and/or angular) positioning of the bonnet 1 with respect to the valve assembly 7.

Figure 23:
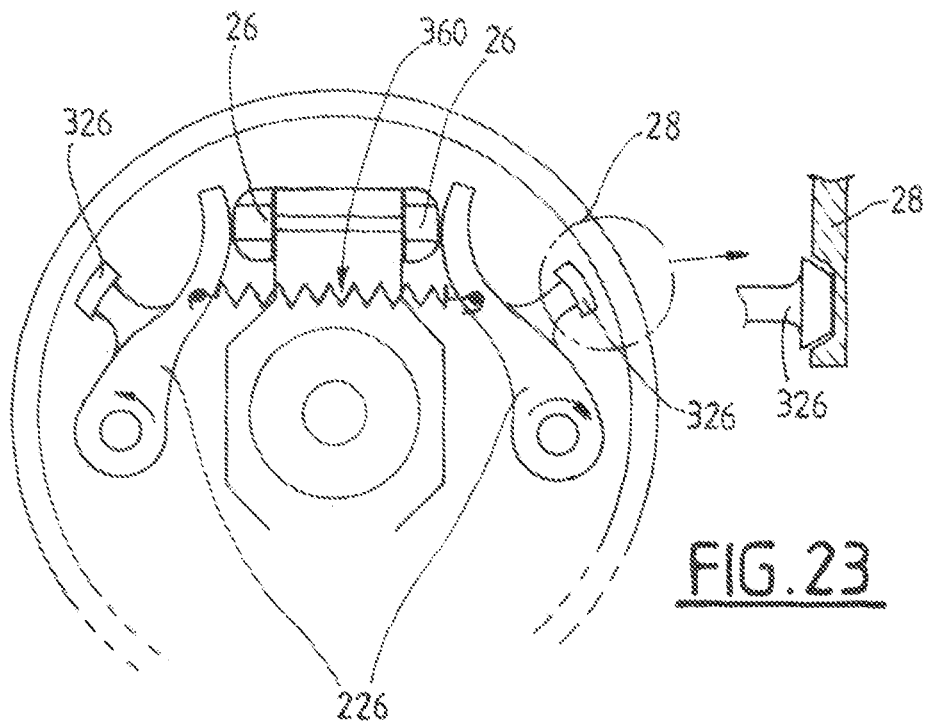
FIG. 23 is a schematic and partial view in cross section illustrating another exemplary embodiment of a pressure indicating device mechanism according to another embodiment.

FIG. 23 illustrates in a view from above yet another alternative form of embodiment of the pressure indicating device. In this example, the information support 28 has the form of a rounded, for example tubular, wall. This information support 28 is blocked vertically by a system of two piston fingers 326 respectively secured two articulated arms 226 forced into a position close together by a return member 360 such as a spring. The two articulated arms 226 are also respectively urged by two by two pistons 26. When the pressure in the cylinder 6 is above a threshold, the pistons 26 separate and the two arms 226 and the fingers 326 interfere with the information support 28 by butting against it (cf. the view in cross section of the enlarged detail in FIG. 23). When the pressure in the cylinder drops below the threshold, the pistons 26 retract in relative terms and the arms 226 move closer together, freeing the information support 28 from the fingers 326. What that means to say is that the information support 28 may be moved by a return spring (not depicted in FIG. 23).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A cylinder of pressurized fluid, comprising:
   a valve assembly housing a fluid circuit comprising at least one shut-off valve,
   the cylinder being equipped with a bonnet for protecting the valve assembly comprising a rigid structure delimiting a protective volume around the valve assembly,
   the cylinder comprising a pressure indicating device comprising at least one piston sensitive to the pressure in the cylinder and mobile relative to the body of the valve assembly according to the level of pressure in the cylinder between at least a retracted first position and a deployed second position,
   the pressure indicating device comprising at least one mobile information support configured to collaborate mechanically with the at least one piston,
   the at least one mobile information support being able to move between at least two distinct positions or states to symbolize respectively at least two levels of pressure according to the position of the at least one piston,
   the at least one mobile information support being mobile relative to the bonnet between at least a first position and a second position which are distinct,
   wherein
   the at least one mobile information support is urged toward the second position via a return member acting only on the at least one mobile information support and not on the at least one piston,
   wherein, in the deployed position, the at least one piston forms an end stop immobilizing the at least one mobile information support in the first position and preventing movement toward the second position, and
   wherein the bonnet comprises at least one opening (31) forming a viewing window for viewing the position or the state of the at least one mobile information support (28).

2. The cylinder as claimed in claim 1, wherein the at least one mobile information support is mobile along a path which coincides at least in part with the at least one opening.

3. The cylinder as claimed in claim 2, wherein the at least one mobile information support is visible through the opening in a viewing direction, wherein the viewing direction is perpendicular to the vertical axis of the cylinder, and wherein the at least one mobile information support is mobile along a path which is not parallel to said viewing direction, wherein the path is parallel to the vertical axis of the cylinder.

4. The cylinder as claimed in claim 1, wherein, in the retracted position, the at least one piston does not impede the movement of the at least one mobile information support toward the second position, thus when the at least one piston is in the retracted position, the at least one mobile information support is automatically moved into the second position by the action of the return member.

5. The cylinder as claimed in claim 1, wherein the at least one at least one mobile information support is arranged between the valve assembly and the bonnet.

6. The cylinder as claimed in claim 1, wherein the at least one piston is mobile relative to the body of the valve assembly into at least three stable positions: the retracted position, the deployed position and at least one intermediate position between the deployed and retracted positions, said three positions respectively corresponding to three distinct levels of pressure in the cylinder.

7. The cylinder as claimed in claim 1, wherein the at least one mobile information support can be moved between at least three stable distinct positions or states respectively symbolizing three distinct levels of pressure.

8. The cylinder as claimed in claim 1, further comprising between two and four pistons sensitive to the pressure in the cylinder, each collaborating with respective or shared at least one mobile information supports.

9. The cylinder as claimed in claim 8, further comprising at least one pistons of which the respective retracted/deployed positions relative to the body of the valve assembly are configured for different determined respective levels of pressure in the cylinder in order to command distinct positions and/or states of one or more of the at least one mobile information supports and respectively display at least three distinct levels of pressure at the at least one opening.

10. The cylinder as claimed in claim 1, wherein the at least one mobile information support comprises a sleeve of cylindrical overall shape mounted mobile between the bonnet and the valve assembly in a vertical direction parallel to the vertical axis of the cylinder and wherein, in at least one of the positions, the at least one mobile information support is situated behind the opening.

11. The cylinder as claimed in claim 1, wherein the at least one mobile information support comprises an external face equipped with visual information comprising at least one of the following: a zone in one or more color(s) or shade(s), one or more alphanumerical symbol(s), the visual information being configured to be exposed in the opening or not exposed depending on the position of the at least one support.

12. The cylinder as claimed in claim 1, further comprising a reference wall fixed to the valve assembly and arranged between the valve assembly and the bonnet.

13. The cylinder as claimed in claim 12, wherein the valve assembly is screwed into a tapped orifice in the cylinder and wherein the reference wall comprises a portion forming an end stop for the vertical positioning of the bonnet with respect to the valve assembly.

14. The cylinder as claimed in claim 12, wherein the reference wall comprises a portion situated facing the at least one opening forming a viewing window.

15. The cylinder as claimed in claim 1, wherein the return member urges and acts directly on the at least one mobile information support in order to move toward the second position.

* * * * *